United States Patent [19]
Martin et al.

[11] Patent Number: 6,165,421
[45] Date of Patent: Dec. 26, 2000

[54] INCINERATION FUMES PROCESSING PLANT WITH INTERNAL RECYCLING

[75] Inventors: Gérard Martin, Saint Génis Laval; Jean-Christophe Dolignier, Paris; Patrick Flament, Auffargis, all of France

[73] Assignee: Institut Francais du Petrole, Cedex, France

[21] Appl. No.: 08/981,843

[22] PCT Filed: May 2, 1997

[86] PCT No.: PCT/FR97/00784

§ 371 Date: Jan. 9, 1998

§ 102(e) Date: Jan. 9, 1998

[87] PCT Pub. No.: WO97/43032

PCT Pub. Date: Nov. 20, 1997

[30] Foreign Application Priority Data

May 9, 1996 [FR] France ................................. 96 05886

[51] Int. Cl.⁷ .................................................. B01D 53/06
[52] U.S. Cl. ......................................................... 422/171
[58] Field of Search ........................... 110/245; 422/141, 422/145, 147, 171; 423/244.01

[56] References Cited

U.S. PATENT DOCUMENTS

| 5,218,931 | 6/1993 | Gorzegno | 122/4 D |
| 5,341,753 | 8/1994 | Russell | 122/4 D |
| 5,344,629 | 9/1994 | Engstrom | 423/239 |

FOREIGN PATENT DOCUMENTS

41 06 319 A1  3/1992  Germany .

*Primary Examiner*—Marian C. Knode
*Assistant Examiner*—Frederick Varcoe
*Attorney, Agent, or Firm*—Antonelli, Terry, Stout & Kraus, LLP

[57] ABSTRACT

An incinerator fumes processing plant has a first reactor (1) with fumes and injected absorbent flowing longitudinally through it. The flow from the first reactor enters a second reactor tangentially. The second reactor (2) is constructed so that the flow is driven by a rotating motion so as to separate progressively, and by centrifugal effect, the solid particles from the gases. The second reactor includes means (2a, 2b) for recirculating in the plant part of the solid particles separated in the second reactor. The dedusted fumes are then discharged from the plant.

13 Claims, 4 Drawing Sheets

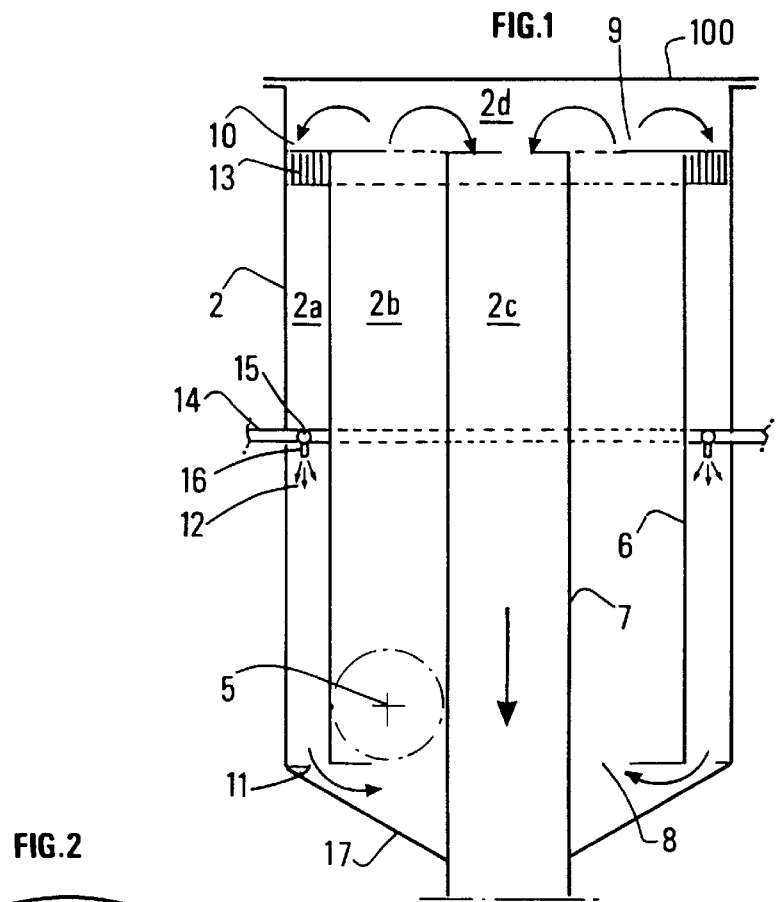
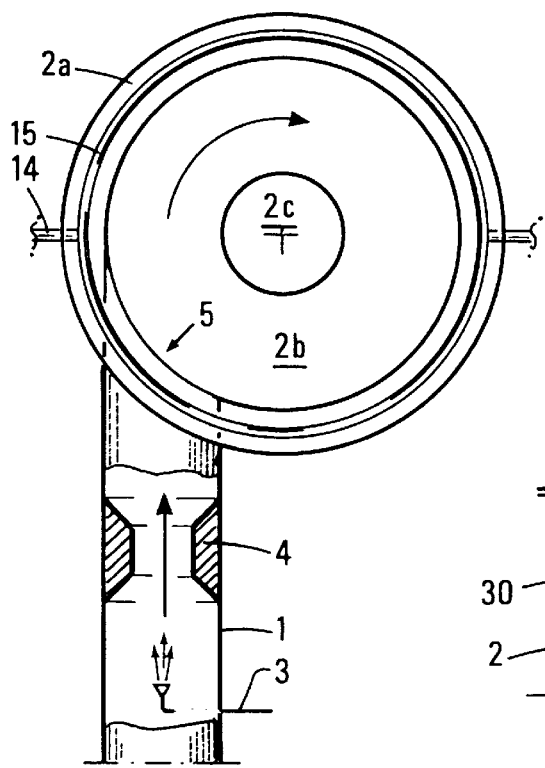
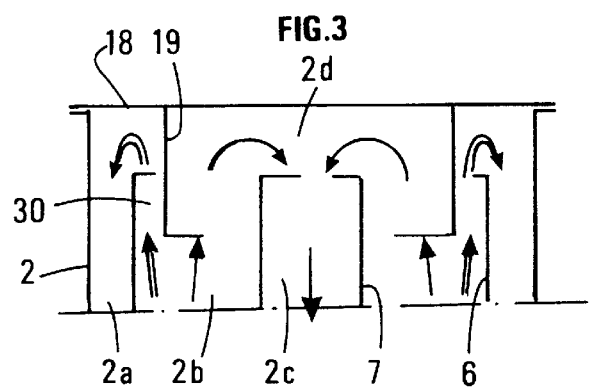

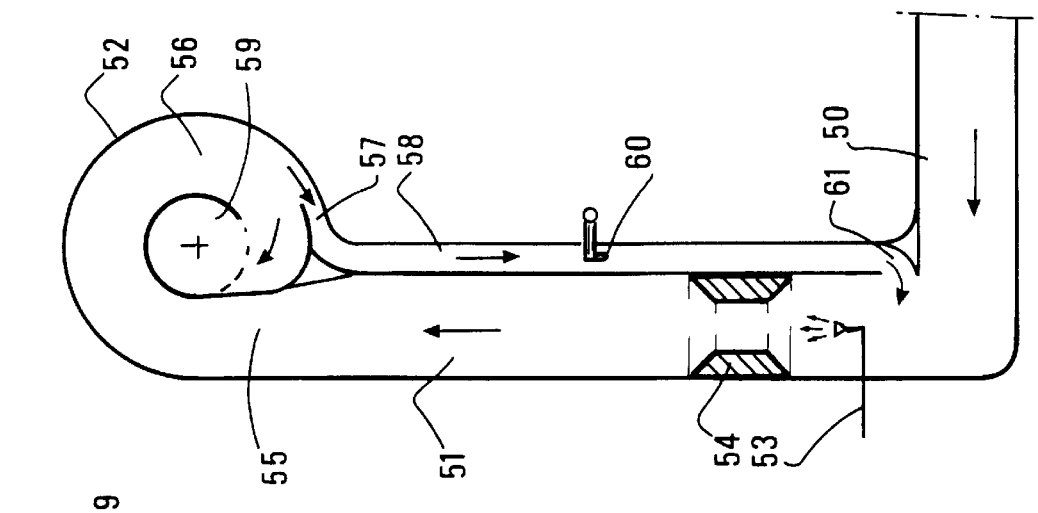
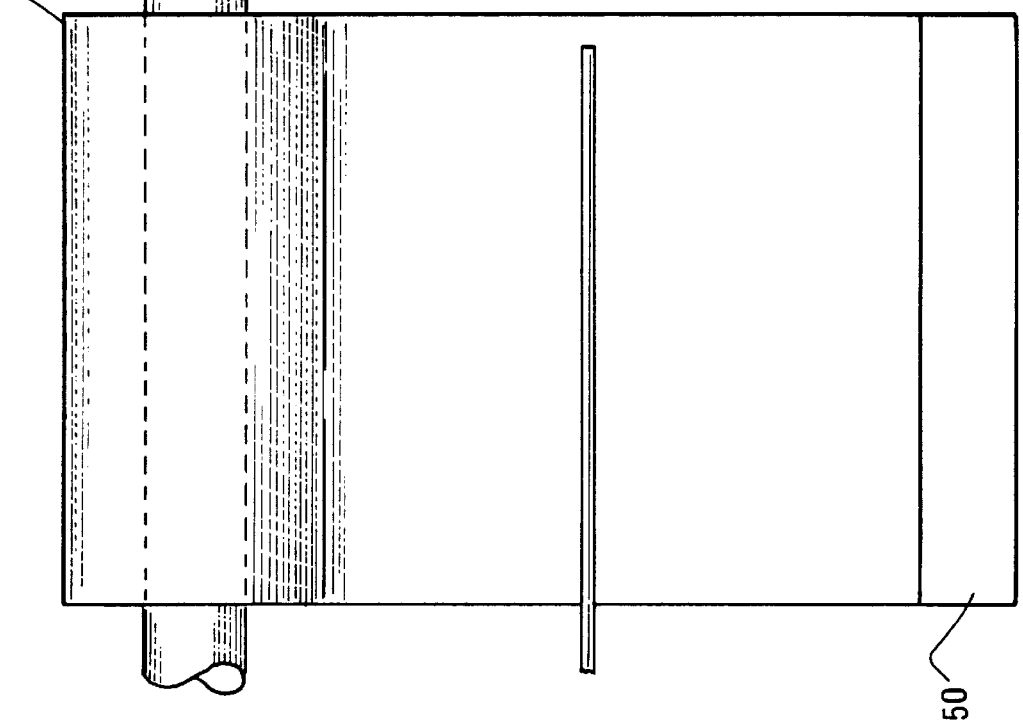

INCINERATION FUMES PROCESSING PLANT WITH INTERNAL RECYCLING

This application is a 371 of PCT/FR97/00784 May 2, 1997.

FIELD OF THE INVENTION

The present invention relates to the field of processing of fumes from incineration plants.

More specifically, the invention relates to the structural aspect of the processing rather than to the physico-chemical aspect. In fact, the aim of the invention is to improve and therefore to cause contact between the gas phase and the particulate phase to be more effective.

BACKGROUND OF THE INVENTION

The problem at the origin of the present invention relates to all the gas-solid reactions involving pulverulent products and thus widely goes beyond the scope of the sole processing of the aforementioned fumes. When heterogeneous reactions are limited by diffusion processes, it is often advisable to operate with very fine products so as to increase the contact surface and to facilitate access of the gases into the particles. On the other hand, the fine particles, i.e. particles with sizes of the order of a micron or of some microns, are very easily carried along by the gas phase. Thus, as soon as they enter the reaction system, the fine particles reach almost instantaneously a displacement velocity that is nearly that of the gas carrying them. As a result, the residence time of the particles in said reaction system is almost identical to that of the gases. This situation can however entail drawbacks when the reaction is slow and might require longer contact times between the solid phase and the gas. On the chemical plane, the consequence of this are poor conversion efficiencies. Although it is possible to increase the conversion efficiency in relation to the gas phase by increasing the solids flow rate, this option is often synonymous with increased operating costs.

Furthermore, it has already been proposed in patent FR-2,669,554 in the name of the applicant to desulfurize combustion gases by fractionating and by remixing several times the gas flow mixed with an absorbent.

In the more specific case of dry processing of fumes from domestic waste incineration plants, the main objective is to collect acid pollutants such as hydrochloric acid by means of an absorbent such as lime. This operation is conducted at low temperature, i.e. between 150 and 400° C., sometimes in the presence of water in order to improve performances somewhat, in reactors of rather simple geometry.

An example of a reactor designed for effluent processing is given in patent FR-2,636,720. This document describes a line provided with a venturi upstream of which means for delivering the absorbent into the gas stream to be processed are arranged. The venturi is intended to provide proper mixing of the powder with the gases. The absorbent collects the acid components during its residence in the line. The gas-absorbent mixture completes its course in a final dust collector which may be an electrostatic precipitator or a bag filter. The residence time of the absorbent in the system is substantially identical to that of the fumes and never exceeds some seconds (2 to 3 seconds for example).

Much longer residence times would be required to complete the reaction under stoichiometric conditions where the Ca/Cl molar ratio is 0.5. This is the reason why a fraction only of the absorbent is used. With current systems, typically 90% of the hydrochloric acid contained in incineration plant fumes can be collected by using absorbent quantities corresponding to a Ca/Cl molar ratio of the order of 1. This means that only just half of the potential of the absorbent is currently used. The used absorbent discharged from the final dust collector thus contains a mixture of calcium chloride and of lime that has not reacted. The process residue is thus not inconsiderable since it represents 40 to 50 kg per ton of domestic waste processed. Disposal problems therefore become increasingly frequent in a context where dumping is prohibited and stabilizing treatments are costly.

It can be noted that, if it is desired to increase the rate of collection of the hydrochlorid acid, the consumption of fresh absorbent has to be significantly increased, which obviously leads to higher residue volumes. To obtain higher acid pollutant collection efficiencies, a solution consists in switching from a dry process to a wet process. In this case, hydrochloric acid collection efficiencies are higher and can reach 99%. This performance is reached with reduced absorbent consumptions since it is then possible to operate slightly above the stoichiometry. The drawback of this option is a much higher investment cost than in the case of dry processes and, in practice, only very high-capacity units are equipped with this type of plant.

The objective of the present invention is to approach the performances of wet processes while carrying on with dry processes. To increase the rate of collection of acid pollutants, two solutions are possible a priori:on the one hand, to increase the gliding between the gas and the particles, but then the laws of mechanics seem difficult to bypass; on the other hand, to achieve massive recycling of the absorbent without using sophisticated and expensive gas-solid separation means. This second option is the basis of the present invention.

SUMMARY OF THE INVENTION

The inventive concept at the basis of the present invention consists in using a device comprising a first zone where the flow is substantially axial, followed by a second zone where the flow is rotational, so as to more or less separate the gas and the solids. The plant according to the invention comprises at least two gas inlets whose orientation and flow conditions are adjusted so as to obtain recirculation of the major part of the particles separated from the flow in the zone where it is rotational.

A first advantage of the invention lies in the capacity of the cyclone device to provide prolonged contact of the solid reactants with the gas phase thanks to the internal recycling of the particles. The recycle ratio may be defined as the mass ratio of the recirculated flow of solids to the flow of solids from the first zone. This ratio can range between 0.5 and 50, which means that, in the most favourable case, the residence time of the solids will be 50 times as long as that of the gases.

In the particular case of incineration fumes dechlorination, internal recycling of the absorbent allows to collect more than 98% or even more than 99% of the hydrochloric acid while the absorbent consumption does not exceed the stoichiometry by more than 30%. Recycling also allows to make a better use of the absorbent. This has two positive consequences:first, less fresh absorbent requirements, and second, lower amounts of residues to be removed, two factors which lead to an operating cost decrease.

The invention also affords another advantage when concentrations of the gaseous reactive species fluctuate with time, which is the case with waste incineration. In fact, the presence in the reaction zone of a very large excess of solid reactants in relation to the gaseous reactants allows to lower any concentration excess of the latter.

Another advantage of the device according to the invention lies in its extreme simplicity since it is made up of a reduced number of static elements. This simplicity is synonymous with great robustness, high serviceability and limited investment costs.

An additional advantage of the plant according to the invention is its flexibility of operation. In fact, the device can be operated with very variable flow rates of gas to be processed and of fresh solid reactants. The solids concentration in the reaction zone can be controlled from the secondary gas flow delivered.

Thus, the object of the present invention is an incinerator fumes processing plant comprising:

a first reactor through which the fumes flow longitudinally, provided with an inlet and an outlet;

means for injecting an absorbent into the first reactor;

a second reactor having an inlet connected to the outlet of the first reactor, wherein the fumes are driven by a rotating motion so as to separate (progressively), by centrifugal effect, the solid particles from the gases circulating therein;

means intended for recirculation, in the plant, of at least part of the solid particles separated in the second reactor;

means designed for discharge of the dedusted fumes, the first and the second reactor being so laid out in relation to each other that the fumes enter the second reactor tangentially.

More specifically, the second reactor is essentially cylindrical and comprises three zones:

a peripheral zone intended to gather and/or to recycle the fumes charged with absorbent particles;

an intermediate zone where a rotating motion is imparted to the flow, and a central zone designed for discharge of the scrubbed fumes.

According to one of the features thereof, the invention also comprises a means such as a venturi placed in the first reactor downstream from the absorbent injection means in order to improve mixing of the absorbent with the fumes to be processed.

The first reactor can advantageously have a cross-section that decreases at the approach of its connection with the second reactor.

According to one of the embodiments of the invention, the three zones of the second reactor are coaxial and substantially perpendicular to the longitudinal axis of the first reactor.

Furthermore, the plant according to the invention can include means intended to generate an underpressure in the peripheral zone.

These means can include an array of injectors intended to homogeneously distribute a gas such as steam, or a fraction of the fumes to be processed, said gas allowing the gases present in the peripheral zone to be sucked out.

Besides, the plant further comprises means such as grids placed at the inlet of the peripheral zone and intended to change the nature of the flow between the intermediate zone and the peripheral zone.

According to one of the embodiments of the invention, the principal axis of the second reactor is substantially vertical.

According to one of its features, the plant further comprises an element placed between the intermediate zone and the peripheral zone, and intended to separate the flow leaving the intermediate zone.

According to another feature, the plant comprises a connecting element (80) between the second and the first reactor, intended to drive the fumes charged with particles towards the first reactor.

According to another embodiment of the invention, the principal axis of the second reactor is substantially horizontal.

BRIEF DESCRIPTION OF THE DRAWINGS

Other details, features and advantages of the present invention will be clear from reading the description hereafter, given by way of non limitative examples, with reference to the accompanying drawings in which:

FIG. 1 is a longitudinal section of a second reactor according to the invention, FIG. 2 is a section showing the connection between the first and the second reactor according to the invention, FIG. 3 is a longitudinal section of another embodiment of the second reactor according to the invention, FIG. 6 is a simplified section of the first and of the second reactor according to a third embodiment of the invention, FIG. 7 is a front view of the third embodiment of the invention.

DESCRIPTION OF THE PREFERRED EMBODIMENTS

Figure 4:
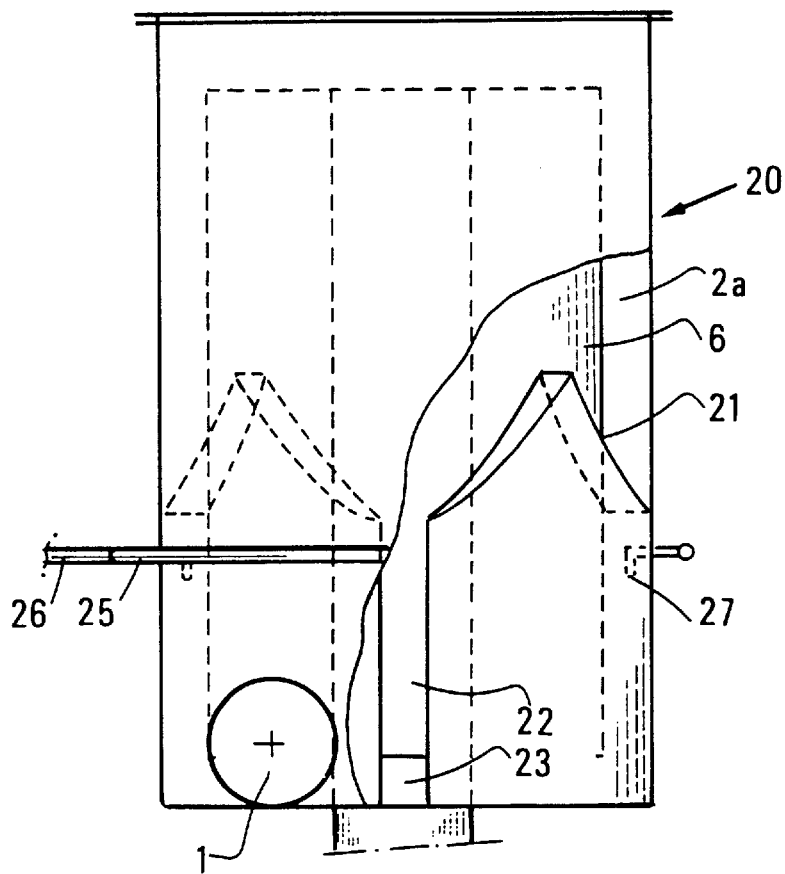
FIG. 4 is a cutaway front view of a second reactor according to a second embodiment of the invention.

A first embodiment of the invention is schematically illustrated in FIGS. 1 and 2 which should be studied in connection with each other as FIG. 1 relates to the second reactor of the plant whereas FIG. 2 shows the first reactor of the plant.

In fact, the plant according to the invention mainly consists of a first reactor (or pipe 1) through which the gases flow in and of a second reactor 2 where the gas stream moves in a helical motion.

Pipe 1 can have a cylindrical, a rectangular or any other section. (A) fresh absorbent injector(s) 3 is or are placed upstream from pipe 1. A venturi type device 4 or of an equivalent type providing proper mixing of the fresh absorbent with the fumes to be processed can be provided downstream from this injector. There may optionally be several mixing devices placed in series in pipe 1. Water or steam can also be injected into pipe 1, and this injection can be achieved upstream or downstream from absorbent injector 3 (water injection is not shown in FIGS. 1 and 2). Pipe 1 has an outlet connected to the inlet of the second reactor.

According to this embodiment of the invention, the second reactor 2 is mainly cylindrical with a substantially vertically oriented longitudinal axis. It is completely sealed in upper parts by a disk 100.

The second reactor 2 mainly comprises three zones that can be coaxial:

a peripheral zone 2a intended for recycling of the absorbent particles, an intermediate zone 2b, mainly annular, which is the reaction zone proper, and a central (or axial) zone 2c intended for discharge of the fumes processed.

The intermediate zone is thus interposed between the peripheral zone and the central zone.

The physical separation between zones 2a and 2b is provided by a substantially cylindrical internal element whereas the separation between zones 2b and 2c is provided by a tubular element 7.

The first pipe 1 is directly connected to intermediate zone 2b via a porthole 5.

Thus, the effluents to be processed, charged with absorbent, are fed tangentially into the lower part 8 of reactor 2. They describe an ascending pseudospiral in intermediate zone 2b.

During this travel, all or part of the particles contained in the gas are progressively centrifuged and brought together in proximity to the cylindrical internal element 6.

Once they have reached the upper end 9 of zone 2b, the gases enter zone 2d where they separate into two flows:a main gas flow slightly charged with particles and which can be discharged through central zone 2c, and a secondary gas flow charged with the major part of the particles, which flows into the recycle peripheral zone 2a.

The secondary gas flow charged with particles flows through peripheral zone 2a from the upper end 10 to the lower end 11, i.e. with a descending motion. In order to maintain and to increase this circulation, gas jets 12 substantially directed towards lower end 11 create an underpressure therein.

A device 13 such as a grid intended to modify the flow by switching from a rotating flow to an axial flow can be provided at the upper end 10 of zone 2a. This device 13 can be perpendicular to the principal axis of the device as shown in FIG. 1, or it can more or less form the continuation of internal element 6.

Production of gas jets 12 is provided by a device comprising a gas supply 14, an O-ring 15 pierced with ports 16 substantially directed towards the end 11 of zone 2a. These ports 16 are generally equidistributed on the whole of O-ring 15 so as to provide homogeneous gas distribution. The carrying gas can be any gas that does not take part in the reaction, but it can also consist of a fraction of the gas to be processed, this gas fraction to be processed being for example taken upstream from pipe 1. In case of dechlorination of the fumes, this gas may also be steam, whose beneficial part in the process of collection of hydrochloric acid by calcic absorbents is well-known. Jets 12 thus create a motion of suction of the gases present in zone 2a, which acts more particularly on the gas fraction highly charged with particles.

In the lower part of reactor 2, internal 6 does not rest on bottom 17 so that a passage is provided for the gas flow leaving zone 2a, which leads this flow back towards intermediate zone 2b.

In other words, at the lower end 11 of zone 2a, the gases highly charged with particles are recycled back to zone 2b. This allows the absorbent concentration to be very significantly increased in said zone. The bottom 17 of cyclone device or second retactor can be truncated-cone-shaped as shown in FIG. 1, but other shapes which, for example, would better "follow" the flow are also possible.

Besides, complementary gas injections (not shown) can also be provided in bottom 17 in order to facilitate circulation of the gas-solids suspension, to prevent sedimentation of particles in zones where the fluids have low velocities, or to help the gas stream coming from pipe 1 to carry over the gas-solids stream migrating to bottom 17.

The circulation velocity of the gases to be processed in pipe 1 ranges between 2 and 200 m/s, preferably between 5 and 50 m/s. The particles introduced have a density between 0.1 and 10, preferably between 1 and 3. The grain size of these particles ranges between 0.2 and 100 micrometers, preferably between 2 and 30 micrometers. The solids flow rates are calculated so as to have particle charges in pipe 1 ranging between 0 and 5 kg/Nm$^3$, preferably between 0.01 and 0.1 kg/Nm$^3$. The length/diameter ratio of the tubular zone can range between 2 and 50, preferably between 5 and 20. The section of porthole 5 can be smaller than that of pipe 1 so as to increase the velocity of the gas-particles suspension at the inlet of intermediate zone 2b and therefore to increase the effect of suction and of carry-over of the gaseous stream charged with recycled absorbent.

The geometry of second reactor 2 can be defined more precisely by means of the H/D ratio, where H is the height of the whole of the cylindrical part and D its outside diameter. This ratio can range between 1 and 20, preferably between 1 and 3.

The distance between tubular element 7 and internal element 6 can be substantially identical to the diameter or to the width of porthole 5, but this distance may also be greater. The diameter of tubular element 7 is selected so as to have a circulation velocity of the gases ranging between 2 and 200 m/s, preferably between 5 and 50 m/s. The diameter and the number of ports 16 are calculated so as to have outlet velocities ranging between 10 and 300 m/s, preferably between 20 and 50 m/s. The mass flow rate of gas introduced into O-ring 15 represents between 1 and 100%, preferably between 5 and 20% of the flow rate of gas to be processed. In steady state, the particle concentration in zone 2a is very high and it can reach 100 kg/Nm$^3$. Of course, since operating conditions are stabilized, the particle concentration is substantially the same at the outlet as at the inlet.

FIG. 3 illustrates a variant of the plant where the upper part of zone 2b is equipped with an internal element 19 of substantially cylindrical geometry, whose purpose is to help to divide the gas circulating in zone 2b among the fraction highly charged with particles and the fraction slightly charged with particles. This internal element 19 is placed so as to cover partially internal element 6 and to form therewith a passage 30 through which the gas fraction highly charged with particles transits.

Thus, the gas fraction charged with particles follows the path shown by double arrows in FIG. 3, whereas the nearly scrubbed gases flow in the direction shown by the simple arrows, as close as possible to the longitudinal axis of reactor 2.

Figure 5:
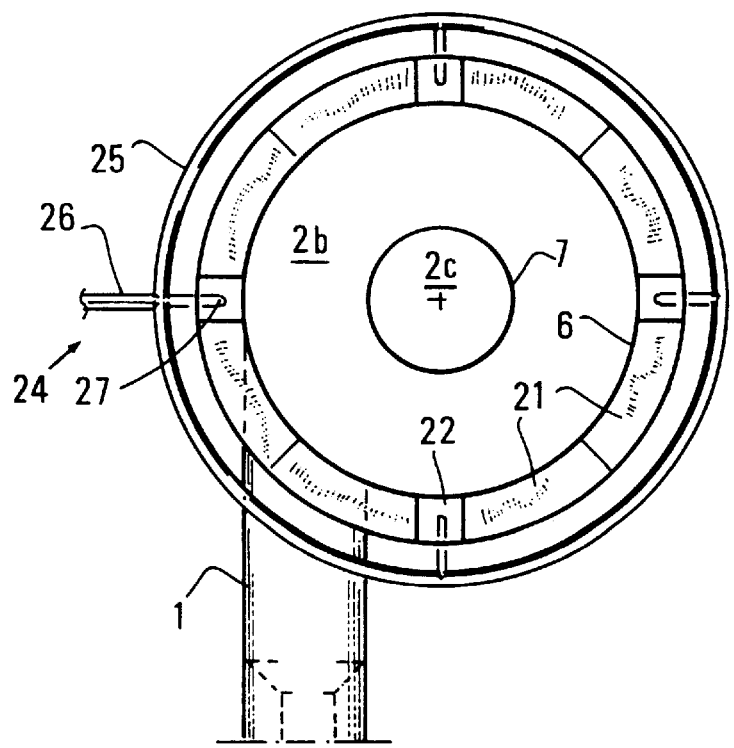
FIG. 5 is a top view (without upper closure) of the second reactor according to the second embodiment of the invention.

FIGS. 4 and 5 illustrate another embodiment where the peripheral recycle zone 2a has been changed. Said zone 2a comprises, in the direction of flow of the recycled stream (i.e. downwards), a first annular space 20 open at the top, that is delimited by convergent plates 21. Convergent plates 21 are connected, at the lower ends thereof, to pipes 22 of rectangular or cylindrical section or of any other section. Said pipes are oriented vertically and they open, at the lower end thereof, into intermediate zone 2b through ports 23. The geometry of ports 23 is such that the particulate suspension is preferably tangentially injected into intermediate zone 2b.

FIG. 5 shows that peripheral zone 2a comprises four zones made up of convergent plates 21, but this number can optionally be different.

The recycled stream is carried along by means of a secondary gas that is injected by means of device 24. This device comprises a toric pipe 25 surrounding reactor 2 and supplied with gas through line 26. Said toric pipe 25 itself supplies lines 27 whose downstream end is oriented so as to produce a gaseous flow in peripheral zone 2a, from end 10 to end 11. This configuration has the advantage of limiting the secondary gas consumption.

FIGS. 6 and 7 (front view) illustrate yet another embodiment of the invention. In this plant, the gas to be processed flows in through a line 50, flows through a first zone (or first reactor) 51 where said gas displays a substantially axial flow, then through a second zone (or second reactor) 52 where a rotating motion is imparted to the flow. Zone 51 can have a rectangular section for example. It has a substantially vertical principal axis. Zone 52 surmounts zone 51 and it is made up of a substantially cylindrical enclosure whose principal axis is preferably substantially horizontal.

The solid reactant, or the absorbent in case of fumes processing, is introduced at the upstream end of zone 51 by means of one or more injectors 53. Injection can also be performed upstream from zone 51, for example in line 50. Zone 51 can be equipped with a device 54 such as a venturi in order to improve mixing between the gas and the solids. At the downstream end of zone 51, the gas-solids suspension is accelerated by flowing through a zone of narrowed section 55. Said suspension thereafter enters zone 52 and flows through a volute 56 where a rotating motion is imparted to the flow as it covers approximately ¾ of the circumference of the volute. The particles are subjected to the centrifugal forces and therefore concentrate in the peripheral part of the volute.

At the outlet of volute 56, the gas stream is divided in two by means of an internal element 57. The part of the flow following the extrados is highly charged with particles and it is led towards a zone 58, whereas the part of the flow following the intrados is slightly charged with particles and passes into horizontal discharge line 59. Internal element 57 is positioned so as to collect only a small part of the gas flow. Zone 58 can be a straight vertical passage of rectangular section placed next to zone 51. Without departing from the scope of the invention, zone 58 can be made up of a series of vertical lines having each its own gas injection.

Gas injectors 60 are preferably directed downwards so as to create a motion of suction at the outlet of volute 56. The velocity and flow rate conditions in these injectors are identical to those mentioned in connection with the embodiment of FIGS. 1 or 2. In this case also, the gas injected can be a neutral gas or directly a fraction of the gas to be processed.

Downstream from zone 58, the gas-solids suspension rejoins the main flow through passage 61, whose orientation and geometry are adjusted so as to favour a suction process.

FIG. 7 is a front view of the embodiment according to FIG. 6 which shows zone 51 with a series of injectors 53 and surmounted by zone 52. Zone 55 between the first reactor and the second reactor can also be narrowed in width in order to accelerate the flow. FIG. 7 shows a single cylindrical zone 52, but several zones 52 mounted on a common gas discharge line 59 may also be considered. In other words, passage of the gases from volute 56 to discharge line 59 can take place over the total width of the device or only at some particular points.

Figure 8:
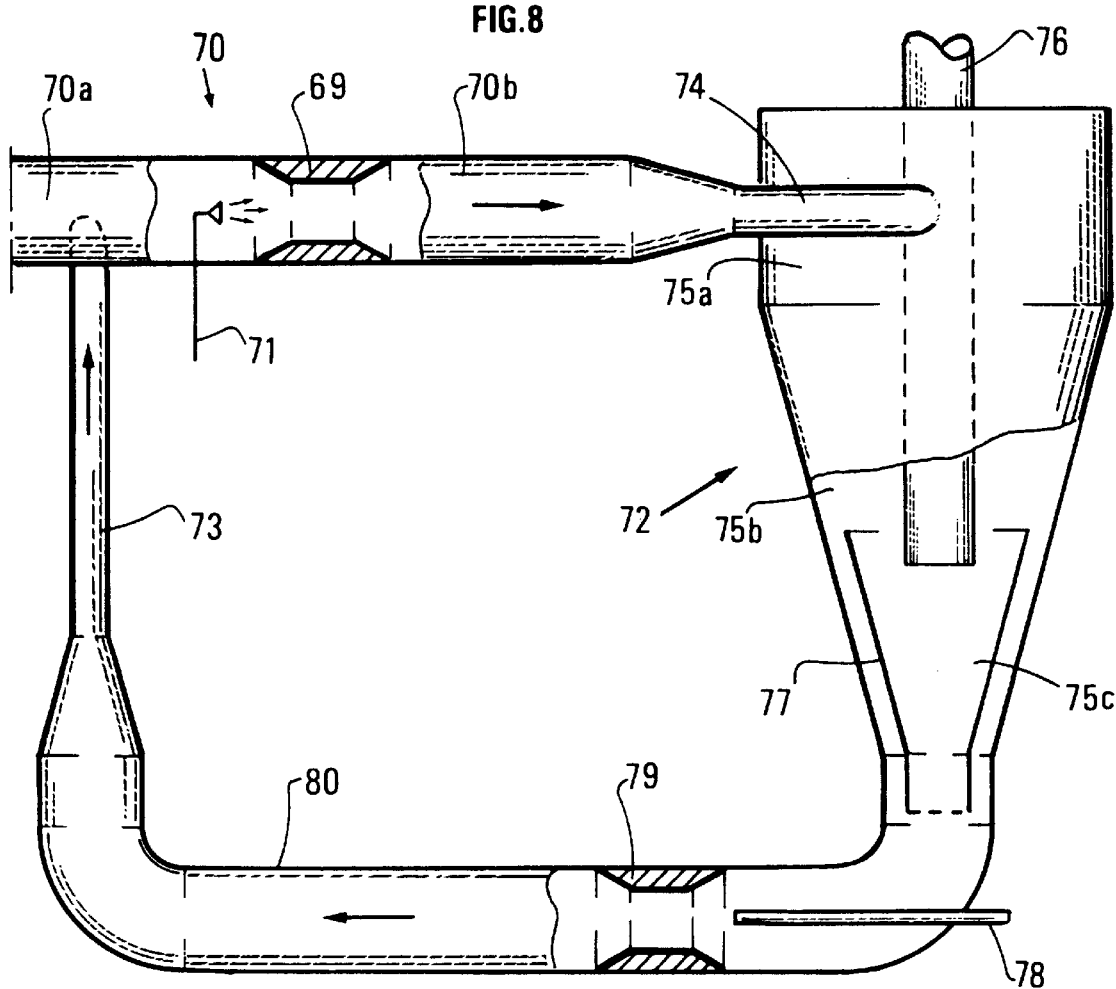
FIG. 8 is a schematic side view of a fourth embodiment of the invention.
Figure 9:
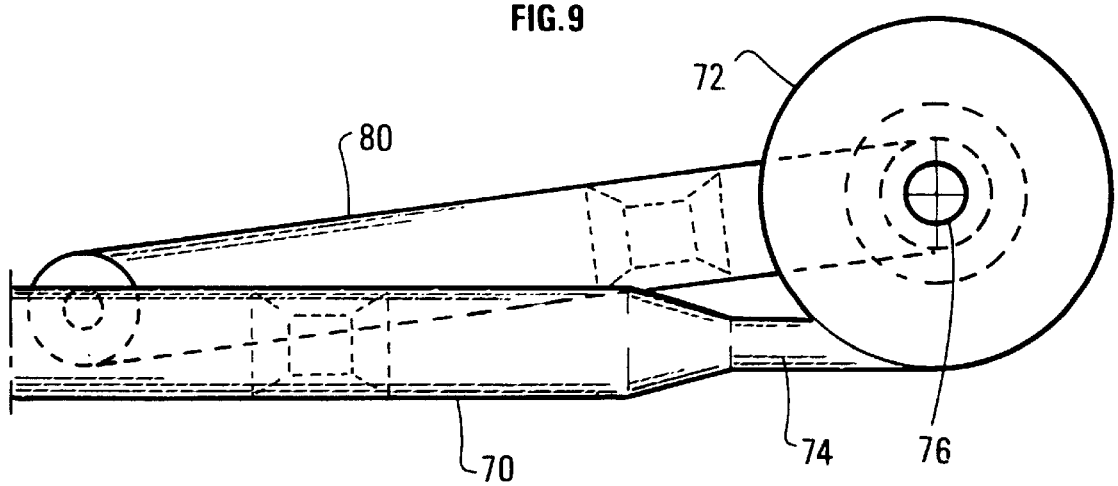
FIG. 9 is a schematic top view of the fourth embodiment of the invention.

FIGS. 8 and 9 schematically illustrate yet another plant according to the invention.

This plant comprises, like the plants according to FIGS. 1 to 5, a first tubular reactor 70 of substantially horizontal axis, absorbent injectors 71 and preferably one or more venturis 69. The cross-section of this reactor decreases at the approach of its connection with the second reactor 72 that has a substantially vertical principal axis. Mixing of the gases to be processed with the absorbent, which is performed in reactor 70, allows the reaction of collection of the acid gases to be triggered therein.

The gas-solid mixture enters the second reactor 72 tangentially via zone 74 whose section is reduced in relation to reactor 70. The mixture thus enters the second reactor 72 at a velocity ranging between 5 and 150 m/s, preferably of the order of 50 m/s.

Furthermore, the mixture moves in a whirling motion due to the tangential inflow.

The reaction of collection of the acid gases progresses in the second reactor 72, first in the upper zone 75a of constant section, then in the lower zone 75b of decreasing section at the bottom, for example in the shape of a funnel.

An internal element 77 is placed at the bottom of zone 75b, coaxial to said zone. Internal 77 allows to isolate the particle-rich effluents which, under the effect of the centrifugal force, end up on the periphery in a zone 75c.

A recycling pipe 80 connecting zone 75b to the first reactor 70, preferably upstream from injectors 71 and venturi 69, is provided below internal element 77 and zone 75b.

One or more venturis 79 can be placed in pipe 80 whose cross-section can decrease at the approach of the connection with reactor 70. In fact, these various means known in the art allow the velocity of the fumes to be increased.

Furthermore, a driving gas can be injected through a injector 78 into pipe 80, preferably below zone 75b. Injector 78 can be advantageously placed at the level of the neck of venturi 79 in order to create an underpressure therein.

The major part of the fumes that has transited through the second reactor 72 leaves it scrubbed through an axial central line 76.

Internal element 77 can have a solid bottom or be devoid of any bottom so as to allow recycling of the fumes and to prevent accumulation of solids.

What is claimed is:

1. Incinerator fumes processing plant comprising:
   a first reactor through which the fumes flow longitudinally, provided with an inlet and an outlet;
   absorbent injection means for injecting an absorbent into the first reactor;
   a second reactor having an inlet connected to the outlet of the first reactor,
   wherein the fumes are driven with a rotating motion so as to separate, by centrifugal effect, solid particles from gases circulating in the second reactor;
   means for recirculation, in the plant, of at least part of the solid particles separated in the second reactor;
   means for discharge of the fumes which have been dedusted of the solid particles;
   wherein the second reactor is mainly cylindrical and comprises three zones physically separated from one another along at least a portion of each of the three zones:
   a peripheral zone to gather and/or to recycle fumes charged with absorbent particles,
   an intermediate zone where a rotating motion is imparted to the flow, and
   a central zone for discharge of the scrubbed fumes;
   wherein the three zones of the second reactor are coaxial and substantially perpendicular to the longitudinal axis of the first reactor, and wherein the first reactor and the second reactor are so laid out in relation to each other that the fumes enter the intermediate zone of the second reactor tangentially.

2. Plant as claimed in claim 1, further comprising a venturi placed in the first reactor downstream from absorbent injection means in order to improve mixing of the absorbent with the fumes to be processed.

3. Plant as claimed in claim 1, wherein the first reactor has a cross-section that decreases at the approach of its connection with the second reactor.

4. Plant as claimed in claim 1, further comprising under pressure means to create an underpressure in peripheral zone.

5. Plant as claimed in claim 4, wherein said underpressure means include an array of injectors intended to homogeneously distribute a gas allowing the gases present in peripheral zone to be sucked out.

6. Incinerator fumes processing plant comprising:
 a first reactor through which the fumes flow longitudinally, provided with an inlet and an outlet;
 absorbent injection means for injecting an absorbent into the first reactor;
 a second reactor having an inlet connected to the outlet of the first reactor wherein the fumes are driven with a rotating motion so as to separate, by centrifugal effect, solid particles from gases circulating in the second reactor;
 means for recirculation, in the plant, of at least part of the solid particles separated in the second reactor;
 means for discharge of the fumes which have been dedusted of the solid particles;
wherein the second reactor is mainly cylindrical and comprises three zones physically separated from one another along at least a portion of each of the three zones:
 a peripheral zone to gather and/or to recycle fumes charged with absorbent particles,
 an intermediate zone where a rotating motion is imparted to the flow, and
 a central zone for discharge of the scrubbed fumes;
 wherein the three zones of the second reactor are coaxial and substantially perpendicular to the longitudinal axis of the first reactor, and wherein the first reactor and the second reactor are so laid out in relation to each other that the fumes enter the intermediate zone of the second reactor tangentially, and further comprising grids placed at the inlet of the peripheral zone of said second reactor to change the nature of the flow between the intermediate zone and the peripheral zone.

7. Plant as claimed in claim 1, wherein the principal axis of the second reactor is substantially vertical.

8. Incinerator fumes processing plant comprising:
 a first reactor through which the fumes flow longitudinally, provided with an inlet and an outlet;
 absorbent injection means for injecting an absorbent into the first reactor;
 a second reactor having an inlet connected to the outlet of the first reactor,
wherein the fumes are driven with a rotating motion so as to separate, by centrifugal effect, solid particles from gases circulating in the second reactor;
 means for recirculation, in the plant, of at least part of the solid particles separated in the second reactor;
 means for discharge of the fumes which have been dedusted of the solid particles;
wherein the second reactor is mainly cylindrical and comprises three zones physically separated from one another along at least a portion of each of the three zones:
 a peripheral zone to gather and/or to recycle fumes charged with absorbent particles,
 an intermediate zone where a rotating motion is imparted to the flow, and
 a central zone for discharge of the scrubbed fumes;
 wherein the three zones of the second reactor are coaxial and substantially perpendicular to the longitudinal axis of the first reactor, and wherein the first reactor and the second reactor are so laid out in relation to each other that the fumes enter the intermediate zone of the second reactor tangentially, and further comprising an element placed between the intermediate zone and the peripheral zone of the second reactor to separate the flow leaving the intermediate zone.

9. Plant as claimed in claim 1, wherein the principal axis of the second reactor is substantially horizontal.

10. Plant as claimed in claim 1, further comprising a connecting element between the second reactor and the first reactor to drive the fumes charged with particles towards the first reactor.

11. Incinerator fumes processing plant comprising:
 a first reactor through which the fumes flow longitudinally, provided with an inlet and an outlet;
 absorbent injection means for injecting an absorbent into the first reactor,
 a second reactor having an inlet connected to the outlet of the first reactor,
wherein the fumes are driven with a rotating motion so as to separate, by centrifugal effect, solid particles from gases circulating in the second reactor;
 means for recirculation, in the plant, of at least part of the solid particles separated in the second reactor;
 means for discharge of the fumes which have been dedusted of the solid particles;
wherein the second reactor is mainly cylindrical and comprises three zones physically separated from one another along at least a portion of each of the three zones:
 a peripheral zone to gather and/or to recycle fumes charged with absorbent particles,
 an intermediate zone where a rotating motion is imparted to the flow, and
 a central zone for discharge of the scrubbed fumes;
 wherein the three zones of the second reactor are coaxial and substantially perpendicular to the longitudinal axis of the first reactor, and wherein the first reactor and the second reactor are so laid out in relation to each other that the fumes enter the intermediate zone of the second reactor tangentially, wherein an internal wall separates at least a portion of the intermediate zone from at least a portion of the peripheral zone.

12. Plant as claimed in claim 11, wherein the central zone is defined by a tubular element separating the central zone from the intermediate zone.

13. Plant as claimed in claim 11, wherein the three zones of the second reactor are coaxial and substantially perpendicular to the longitudinal axis of the first reactor.

* * * * *